United States Patent
Suzuki (10) Patent No.: US 11,579,820 B2
(45) Date of Patent: Feb. 14, 2023

(54) IMAGE FORMING APPARATUS UPDATING STATUS INFORMATION TO INDICATE THAT CONSUMABLE CAN BE TEMPORARILY USED IN ANOTHER IMAGE FORMING APPARATUS

(71) Applicant: BROTHER KOGYO KABUSHIKI KAISHA, Nagoya (JP)

(72) Inventor: Takayuki Suzuki, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/527,784

(22) Filed: Nov. 16, 2021

(65) Prior Publication Data
US 2022/0171583 A1    Jun. 2, 2022

(30) Foreign Application Priority Data
Nov. 27, 2020    (JP) .............................. JP2020-197576

(51) Int. Cl.
*G06F 3/12* (2006.01)
(52) U.S. Cl.
CPC .......... *G06F 3/1219* (2013.01); *G06F 3/1205* (2013.01); *G06F 3/1235* (2013.01)
(58) Field of Classification Search
None
See application file for complete search history.

(56) References Cited

U.S. PATENT DOCUMENTS

| | | | |
|---|---|---|---|
| 2006/0071952 A1* | 4/2006 | Motominami | B41J 3/46 347/5 |
| 2016/0292550 A1* | 10/2016 | Kawai | G06K 15/102 |
| 2017/0090830 A1* | 3/2017 | Tomono | G06F 3/1285 |
| 2018/0131831 A1 | 5/2018 | Tolia et al. | |
| 2019/0107984 A1* | 4/2019 | Kanamori | G06F 3/1285 |

* cited by examiner

*Primary Examiner* — Henok Shiferaw
(74) *Attorney, Agent, or Firm* — Merchant & Gould P.C.

(57) ABSTRACT

In an image forming apparatus, a consumable accommodates printing material and is mounted in a main casing. The consumable includes a consumable memory. A controller performs a restriction process to rewrite the first status information to indicate the used product to prohibit the consumable from being used in other image forming apparatuses in a case where first status information stored in the one of the consumable memory and a main memory indicates the new product. The controller performs an updating process to update the second status information so that the second status information indicates that the consumable can be temporarily used in the another image forming apparatus in a case where the controller receives a contract cancellation instruction. The contract cancellation instruction instructs to cancel an agreement concluded for the image forming apparatus.

12 Claims, 6 Drawing Sheets

IMAGE FORMING APPARATUS UPDATING STATUS INFORMATION TO INDICATE THAT CONSUMABLE CAN BE TEMPORARILY USED IN ANOTHER IMAGE FORMING APPARATUS

CROSS REFERENCE TO RELATED APPLICATION

This application claims priority from Japanese Patent Application No. 2020-197576 filed Nov. 27, 2020. The entire content of the priority application is incorporated herein by reference.

BACKGROUND

In recent years, a wide range of flat-rate printing services is provided to users of image forming apparatuses. The flat-rate printing service is known as a subscription service and allows a user to subscribe to a printing service for each image forming apparatus. For example, on a contracted machine, i.e., an image forming apparatus for which an agreement is concluded to use the flat-rate printing service, printing is allowed at a fixed rate up to a preset number of pages within a predetermined period.

Under a flat-rate printing service, generally the service provider specifies that subscription consumables for exclusive use with the flat-rate printing service are to be used in the image forming apparatus for which the agreement is concluded. In such cases, a mechanism to ensure the appropriate use of subscription consumables on the contracted machine is needed.

In order to ensure the appropriate use of subscription consumables, a technology is disclosed for differentiating between subscription consumables and ordinary consumables that can be used independent of entering a service, for example. Another technology is disclosed for managing subscription consumables and contracted machines in association with each other so that the subscription consumables are used on specific contracted machines.

SUMMARY

The user may change contracted machines for a variety of reasons. Conventionally, a change in contracted machines is achieved through the following procedure. For example, first the new image forming apparatus (hereinafter "new apparatus") is delivered to the user. Second, the user completes a procedure to conclude an agreement for the new device. Third, the service provider provides consumables specific to the new device to the user based on the concluded agreement. In other words, there would be a problem of inconvenience for the user because the user cannot immediately use the flat-rate printing service with the new apparatus but must wait for a period of time after the new apparatus is purchased until the special consumables for the new apparatus are delivered.

It is an object of the present disclosure to provide an image forming apparatus that enhances convenience for a user by reducing or eliminating the period of time that service is temporarily unavailable when the contracted machine is changed.

In order to attain the above and other objects, the disclosure provides an image forming apparatus. The image forming apparatus includes a main casing, a main memory, a consumable, and a controller. The consumable is configured to accommodate printing material and to be mounted in the main casing, the consumable including a consumable memory. At least one of the main memory and the consumable memory stores first status information indicating one of that the consumable is a new product and that the consumable is a used product that can be used only in the image forming apparatus. The consumable memory stores second status information indicating one of that the consumable can be temporarily used in another image forming apparatus and that the consumable cannot be temporarily used in the another image forming apparatus. The controller is configured to perform: a restriction process to rewrite the first status information to indicate the used product to prohibit the consumable from being used in other image forming apparatuses in a case where the first status information stored in the one of the consumable memory and the main memory indicates the new product; and an updating process to update the second status information so that the second status information indicates that the consumable can be temporarily used in the another image forming apparatus in a case where the controller receives a contract cancellation instruction, the contract cancellation instruction instructing to cancel an agreement concluded for the image forming apparatus. Accordingly, the consumable can transition to a state where the consumable can be used in a new apparatus, such as the another image forming apparatus from a state where the consumable can be used only in the current image forming apparatus.

According to another aspect, the disclosure provides a method for controlling an image forming apparatus. The image forming apparatus includes: a main casing; a main memory; a consumable configured to accommodate printing material and to be mounted in the main casing, the consumable including a consumable memory; and a controller. At least one of the main memory and the consumable memory stores first status information indicating one of that the consumable is a new product and that the consumable is a used product that can be used only in the image forming apparatus. The consumable memory stores second status information indicating one of that the consumable can be temporarily used in another image forming apparatus and that the consumable cannot be temporarily used in the another image forming apparatus. The method includes: a restriction step to rewrite the first status information to indicate the used product to prohibit the consumable from being used in other image forming apparatuses in a case where the first status information stored in the one of the consumable memory and the main memory indicates the new product; and an updating step to update the second status information so that the second status information indicates that the consumable can be temporarily used in the another image forming apparatus in a case where a contract cancellation instruction is received, the subscription cancellation instruction instructing to cancel an agreement concluded for the image forming apparatus. Accordingly, the consumable can transition to a state where the consumable can be used in a new apparatus, such as the another image forming apparatus from a state where the consumable can be used only in the current image forming apparatus.

BRIEF DESCRIPTION OF THE DRAWINGS

The particular features and advantages of the disclosure as well as other objects will become apparent from the following description taken in connection with the accompanying drawings, in which.

DETAILED DESCRIPTION

First Embodiment

Below, an embodiment of the disclosure will be described while referring to FIGS. 1 through 6. In the embodiment, an inkjet printer will be described as an example of the image forming apparatus. However, the image forming apparatus 1 may be a printer other than an inkjet printer. For example, the image forming apparatus 1 may be a laser printer.

Overview of an Image Formation System

Figure 1:
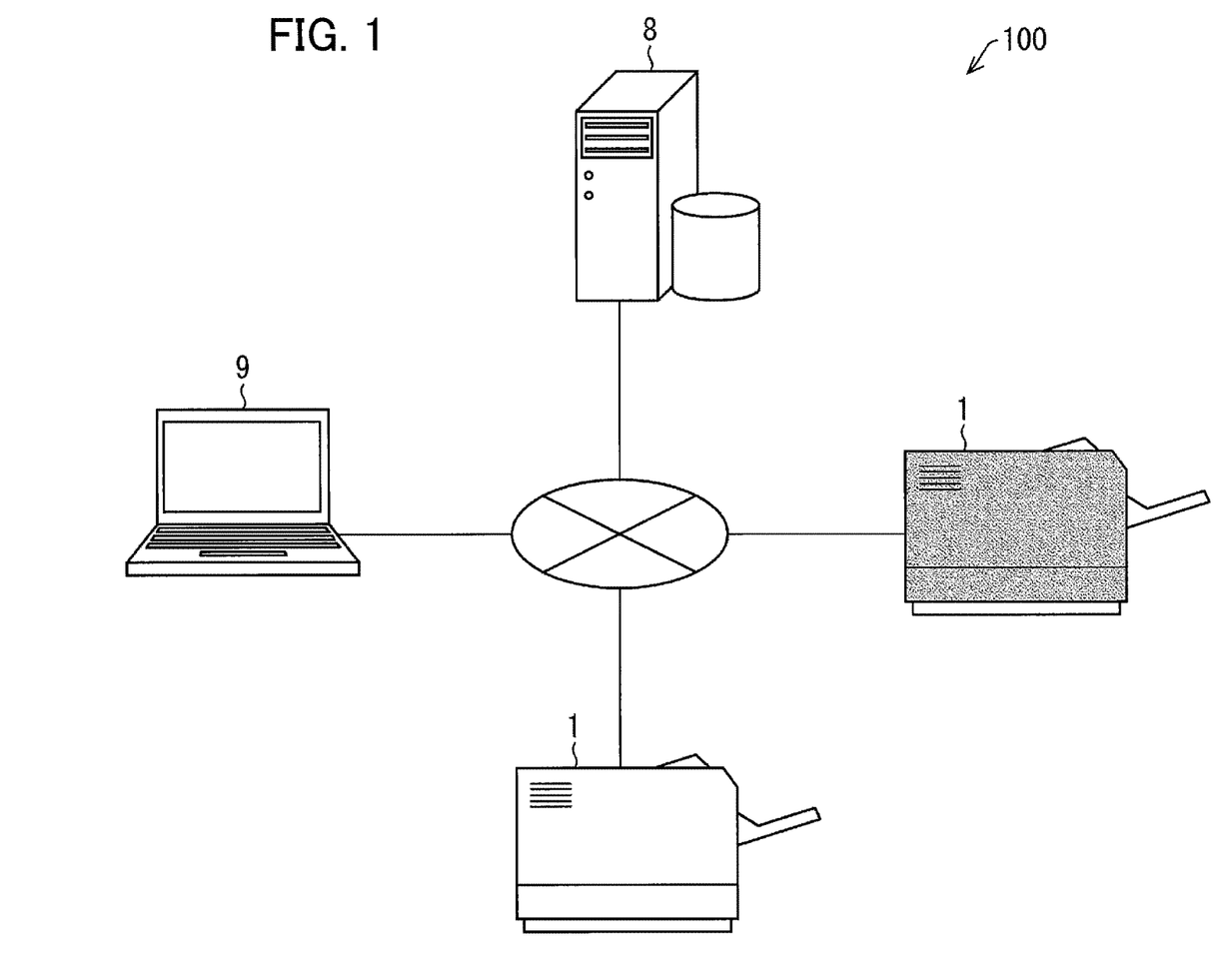
FIG. 1 is an explanation diagram illustrating an overview of an image formation system.

FIG. 1 shows an overview of an image formation system 100 according to the embodiment. On the image formation system 100, a company provides a user of the image forming apparatus 1 with a printing service based on an agreement concluded between the company and the user. Hereinafter, a flat-rate printing service provided based on the agreement will be called a subscription service. Printing executed by the image forming apparatus 1 using the provided subscription service will be called subscription printing, which is distinguished from ordinary printing executed unrelated to an agreement. Ordinary printing executed unrelated to an agreement will be called normal printing in the following description.

As shown in FIG. 1, the image formation system 100 includes a plurality of image forming apparatuses 1, a server 8, and a user terminal 9. The image forming apparatuses 1 used by the user are devices that execute printing using the subscription service. The server 8 used by the company is a device for managing image forming apparatuses 1 for which agreements are concluded and which are allowed to use the subscription services. Hereinafter, an image forming apparatus 1 for which an agreement is concluded and which is allowed to use the subscription service will be called a contracted machine. The user terminal 9 used by a user is a device that communicates with the server 8 in order to conclude and cancel the agreement and perform other procedures. An information processing terminal equipped with standard communication functions, such as a personal computer (PC) or a smartphone, may be employed as the user terminal 9. The devices configuring the image forming apparatus 1 can communicate with each other over a communication network such as the Internet.

The plurality of image forming apparatuses shown in FIG. 1 represent image forming apparatuses 1 purchased by the same user. However, while not shown in the drawing, the image formation system 100 may include other image forming apparatuses purchased by other users.

Each of the plurality of image forming apparatuses 1 can use special consumables or special replacements for the subscription according to the agreement between the user and the company. As an example of the agreement, the company providing the subscription service and the user agree on a usage period, a usage fee, a maximum number of pages, and the like of the subscription service, and both parties agree that the company will provide the user with this subscription service. In other words, once the agreement for the subscription service is concluded, the image forming apparatus 1 according to the embodiment can execute subscription printing, which is printing under the contents of the agreement.

On the image formation system 100, the timing of (1) and (2) given below may differ in a subscription service with which the company provides the user.

(1) The timing at which the server 8 recognizes the image forming apparatus 1 as the contracted machine for which the agreement is concluded (2) The timing at which the server 8 considers usage of the subscription service to start in the image forming apparatus 1

In other words, the server 8 may recognize that the image forming apparatus 1 "is a contracted machine but does not yet start using the subscription service."

Note that "the server 8 recognizes the image forming apparatus 1 as the contracted machine" in (1) may be triggered by a transition in the state of the image forming apparatus 1 from a non-subscription mode denoting that the agreement is not yet concluded to a subscription mode denoting that the agreement is concluded.

Further, "considers usage of the subscription service to start" in (2) merely denotes that the server 8 recognizes that "usage of the subscription service starts on a certain date and time." Therefore, the timing at which the server 8 considers that usage of the subscription service to start may not match the timing at which the image forming apparatus 1 actually executes a subscription print.

Unless otherwise stated, the subscription service is a fee-based service in the following description. Here, the timing of (1) is the timing at which the server 8 recognizes the image forming apparatus 1 as the contracted machine and is not a trigger for starting charges, while (2) is the timing at which charging starts.

In other cases, the timing of (1) and the timing of (2) described above may be substantially the same. For example, both (1) and (2) described above may be triggered by a special ink cartridge, which is specific to subscription service and used for subscription printing, being mounted in the image forming apparatus 1. Below, special ink cartridges for the subscription service for use in subscription printing will be called subscription cartridges. The image forming apparatus 1 reads prescribed information from a cartridge memory in the mounted subscription cartridge and transmits this prescribed information to the server 8, for example. Upon receiving the prescribed information from the image forming apparatus 1, the server 8 recognizes the image forming apparatus 1 as the contracted machine and considers that usage of the subscription service starts in the image forming apparatus 1.

A case in which the image forming apparatus 1 is an inkjet printer that prints data on a printing paper by ejecting ink (printing material) will be described as an example in the embodiment. One or more ink cartridges are mounted in the main casing of the image forming apparatus 1. As the example for the embodiment, ink cartridges having the four ink colors cyan (C), magenta (M), yellow (Y), and black (BK) are mounted in the image forming apparatus 1. While not shown in the drawings, the image forming apparatus 1 may also be provided with a display portion including a liquid crystal display, lamps, and the like; and an input interface including buttons and the like. The liquid crystal display may also be integrally configured with a touchscreen that functions as the input interface.

In the example shown in FIG. 1, one image forming apparatus 1 indicates a presently contracted machine for which an agreement is concluded, while another image forming apparatus 1 indicates an image forming apparatus 1 for which an agreement will newly be concluded in place of the presently contracted image forming apparatus 1. Below, the action of changing the presently contracted machine from the current image forming apparatus 1 to another image forming apparatus 1 will be called "changing contracted machines." Further, the image forming apparatus 1 that is the presently contracted machine will be called the "pre-change image forming apparatus 1." Further, another image forming apparatus 1 for which the agreement will newly be concluded or another image forming apparatus 1 for which the agreement is newly concluded in place of the pre-change image forming apparatus 1 will be called the "post-change image forming apparatus 1." The pre-change image forming apparatus 1 and the post-change image forming apparatus 1 will both simply be called image forming apparatuses 1 when there is no particular need to distinguish between them or when describing matters that are commonly applicable to both image forming apparatuses 1.

Overall Structure of the Image Forming Apparatus 1

Figure 2:
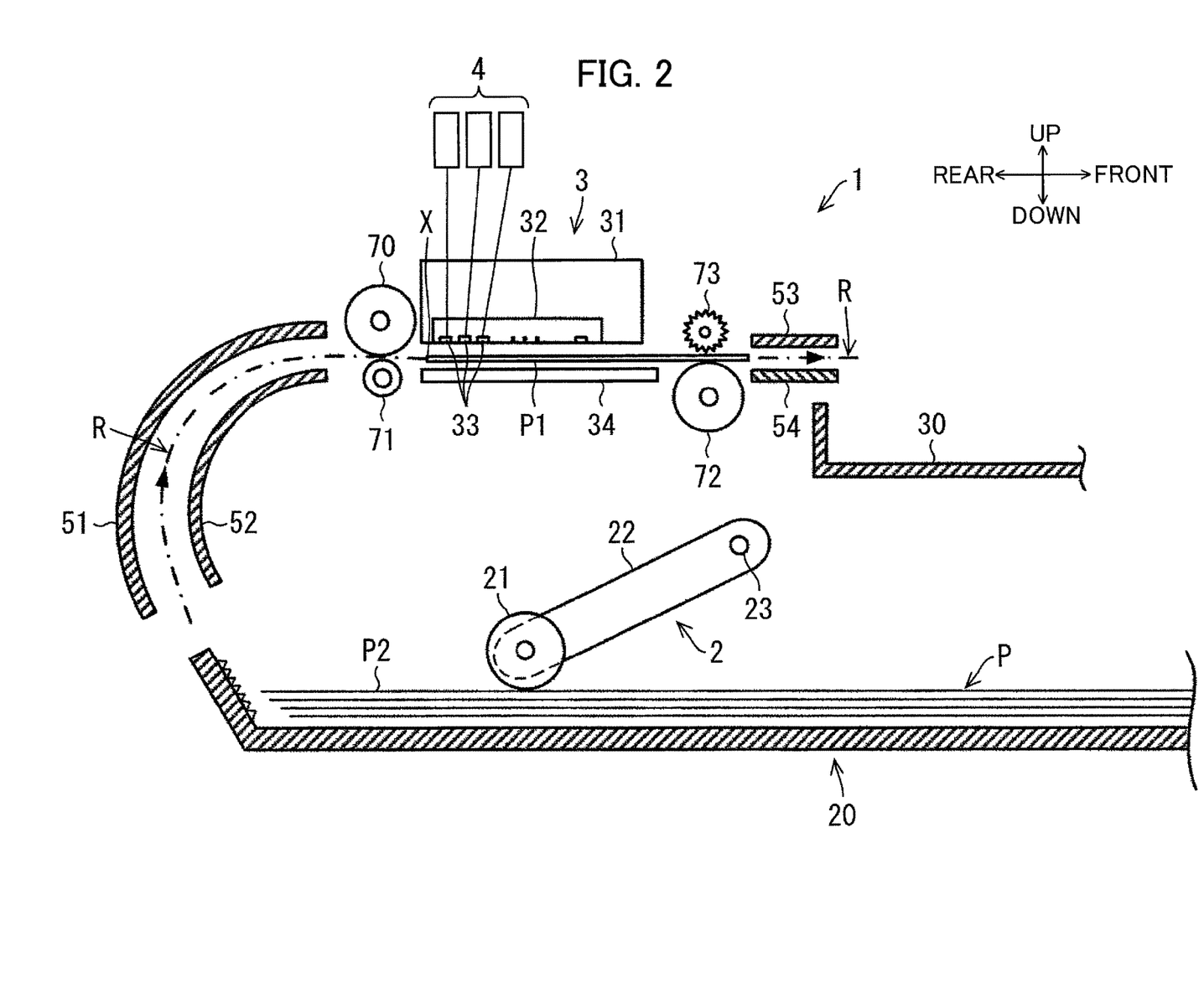
FIG. 2 is an explanation diagram illustrating an overview for a structure of an image forming apparatus.

FIG. 2 shows an overview for the structure of the image forming apparatus 1 according to the embodiment. For convenience, the following description will refer to the top side in FIG. 2 as the top side of the image forming apparatus 1, the bottom side in FIG. 2 as the bottom side of the image forming apparatus 1, the left side in FIG. 2 as the rear side of the image forming apparatus 1, and the right side in FIG. 2 as the front side of the image forming apparatus 1.

The image forming apparatus 1 is an inkjet printer that prints data on a printing sheet P by ejecting ink. One or more ink cartridges are mounted in the main casing of the image forming apparatus 1. In addition to the members shown in FIG. 2, the image forming apparatus 1 may also be provided with the display portion that includes a liquid crystal display, lamps, and the like; and the input interface that includes buttons and the like. The liquid crystal display may also be integrally configured with a touchscreen and may be configured to function as the input interface.

In the example of FIG. 2, the image forming apparatus 1 is provided with a paper tray 20, a sheet-feeding portion 2, a conveying roller 70, a recording portion 3, a discharge roller 72, and a discharge tray 30. An opening is formed in the front side of the image forming apparatus 1. The paper tray 20 is positioned in the opening and can be moved in the front-rear direction. A plurality of stacked printing sheets P is accommodated in the paper tray 20. The printing sheets P are papers of a prescribed size, for example. The printing sheets P are not limited to paper media, for example the printing sheets P may be formed of a resin material, such as transparency sheets.

The sheet-feeding portion 2 has a feed roller 21, a feed arm 22, and a shaft 23. Through forward rotation of the feed roller 21, the sheet-feeding portion 2 feeds a printing sheet P accommodated in the paper tray 20 onto a conveying path R. The feed roller 21 is rotatably provided on the distal end of the feed arm 22. The feed arm 22 is pivotably provided on the shaft 23, which is supported in a frame of the image forming apparatus 1. The feed arm 22 is urged to rotate toward the paper tray 20 by its own weight or the elastic force of a spring or the like. A motor (not shown) is provided in the image forming apparatus 1. When the motor rotates in reverse, a drive force from the motor is transmitted to the feed roller 21, causing the feed roller 21 to rotate forward.

The conveying path R is a space formed by a guide member 51, a guide member 52, the recording portion 3, a guide member 53, a guide member 54, and the like.

The conveying roller 70 is positioned upstream of the recording portion 3 in the conveying direction. A pinch roller 71 is positioned to confront the bottom portion of the conveying roller 70. The conveying roller 70 is rotated by the drive force of a motor included in the image forming apparatus 1. The pinch roller 71 rotates along with the rotation of the conveying roller 70. In a state where the printing sheet P is pinched between the conveying roller 70 and the pinch roller 71, the printing sheet P is conveyed to an image-recording position X on the conveying path R by the forward rotation of the conveying roller 70 and the pinch roller 71. The image-recording position X is the position at which a recording head 32 records images on the printing sheet P. When the motor in the image forming apparatus 1 rotates forward, the drive force from the motor is transmitted to the conveying roller 70, causing the conveying roller 70 to rotate forward. When the motor rotates in reverse, the drive force of the motor is transmitted to the conveying roller 70, causing the conveying roller 70 to rotate in reverse. Forward rotation of the motor in the image forming apparatus 1 corresponds to rotation in the first direction, and reverse rotation of the motor corresponds to rotation in the second direction.

The recording portion 3 is positioned along the conveying path R between the conveying roller 70 and the discharge roller 72. The recording portion 3 includes a carriage 31, a recording head 32, a plurality of nozzles 33, and a platen 34. Each of the nozzles 33 is also connected to a corresponding ink cartridge 4. Note that there is no particular restriction on the numbers of nozzles 33 and ink cartridges 4.

Each ink cartridge 4 includes a cartridge casing. The cartridge casing can be mounted in the main casing of the image forming apparatus 1. The ink cartridges 4 accommodate ink in mutually different colors (the colors cyan, magenta, yellow, and black, for example) as the material used for image formation. The ink is a consumable that is consumed during each print.

The carriage 31 reciprocates in directions orthogonal to the conveying direction, i.e., in the width direction of the printing sheet P. During image recording on the printing sheet P, the image forming apparatus 1 performs a recording process and a line feed process. In the recording process, the image forming apparatus 1 records one line worth of an image on the printing sheet P by moving the carriage 31 in the width direction of the printing sheet P and simultaneously ejecting ink from the nozzles 33 in the recording head 32 in a state where conveyance of the printing sheet P is halted. In the line feed process, the image forming apparatus 1 drives the conveying roller 70 and the discharge roller 72 to convey the printing sheet P a prescribed line feed amount. The image forming apparatus 1 repeatedly performs these recording and line feed processes.

As shown in FIG. 2, the recording head 32 is mounted in the carriage 31. The nozzles 33 are provided in the bottom surface of the recording head 32. The recording head 32 ejects ink droplets from the nozzles 33. The platen 34 is a rectangular plate-shaped member that supports the printing sheet P. In a process in which the carriage 31 moves relative to the printing sheet supported on the platen 34, the recording head 32 selectively ejects ink droplets toward the printing sheet P to record an image on the printing sheet P.

The discharge roller 72 is positioned downstream of the recording portion 3 in the conveying direction. Spur rollers 73 are positioned to confront the top portion of the discharge roller 72. The discharge roller 72 is driven by a motor provided in the image forming apparatus 1. The spur rollers 73 rotate along with the rotation of the discharge roller 72. A printing sheet P pinched between the discharge roller 72 and the spur rollers 73 is discharged into the discharge tray 30 by the forward rotation of the discharge roller 72 and the spur rollers 73.

The discharge tray 30 is positioned above the paper tray 20. The discharge tray 30 supports printing sheets P discharged by the discharge roller 72.

Internal Structures of the Image Forming Apparatus 1, Ink Cartridge 4, and Server 8

Figure 3:
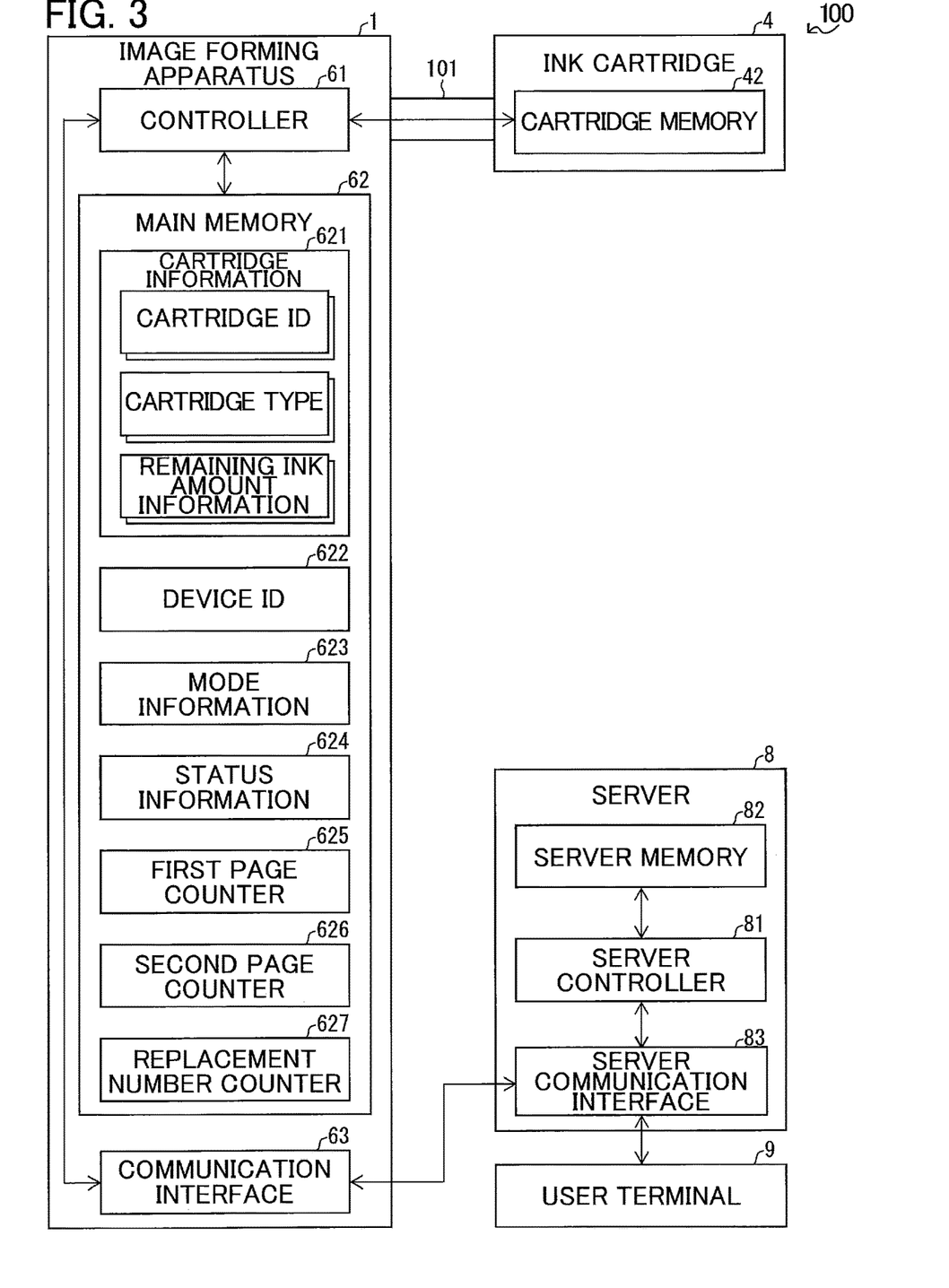
FIG. 3 is a block diagram illustrating principal structures of the image forming apparatus, an ink cartridge, and a server.

FIG. 3 is a block diagram showing the principal structures of the image-forming device 1, the ink cartridge 4, and the server 8 in the embodiment.

Ink Cartridges 4

Each of the ink cartridges 4 has a cartridge memory 42 (the consumable memory). The cartridge memory 42 is a memory from which information can be read and to which information can be written. The cartridge memory 42 is flash read-only memory (flash ROM) or electrically erasable programmable ROM (EEPROM; registered trademark), for example.

The cartridge memory 42 has one or more storage areas for storing information related to the ink cartridge 4. For example, the cartridge memory 42 has first through fifth areas. The data structure of the cartridge memory 42 will be described in greater detail with reference to FIG. 4.

The main casing of the image forming apparatus 1 has connectors 101. When an ink cartridge 4 is mounted in the main casing of the image forming apparatus 1, the corresponding connector 101 is electrically connected to the cartridge memory 42. Through this connection, a controller 61 in the image forming apparatus 1 can communicate with the cartridge memory 42 in the ink cartridge 4.

Image Forming Apparatus 1

The image forming apparatus 1 has the controller 61, a main memory 62, and a communication interface 63. The controller 61 has an application specific integrated circuit (ASIC), for example. The controller 61 is electrically connected to the main memory 62 and the communication interface 63 provided in the main casing of the image forming apparatus 1. By executing various operations, the controller 61 can perform various printing-related processes in the image forming apparatus 1.

The controller 61 may also be provided with a central processing unit (CPU) or another processor. In this case, a control program for implementing the control method of the image forming apparatus may be stored in the main memory 62, and the controller 61 may control the image forming apparatus 1 to perform various processes by the processor performing operations according to the control program.

The controller 61 may also be provided with a computer-readable storage medium, such as the main memory 62, that stores the control program. Here, the storage medium may be a "non-transitory, tangible medium," such as ROM, a tape, a disc, a card, a semiconductor memory, or a programmable logic circuit. A random access memory (RAM) may also be used for developing the control program. The control program may also be supplied to the computer described above via any transmission medium (a communication network, broadcast waves, etc.) capable of transmitting the control program. Note that one aspect of the present disclosure is that the control program can be implemented in the form of data signals embedded in a carrier wave, as embodied in electronic transmission.

When the ink cartridge 4 is mounted in the image forming apparatus 1, the ink cartridge 4 is electrically connected to the controller 61, as illustrated in FIG. 3. Consequently, the controller 61 can execute a read process to read information from the cartridge memory 42 and a write process (including a rewrite process) to write information to the cartridge memory 42.

The main memory 62 is a memory from which information can be read and to which information can be written. The main memory 62 is flash ROM or EEPROM (registered trademark), for example. The main memory 62 has one or more storage areas that store various information, such as that described in the following example.

Cartridge information 621 is information related to the ink cartridge 4 of each color mounted in the image forming apparatus 1. Specifically, the cartridge information 621 includes, for each ink cartridge 4, information which is read from the corresponding cartridge memory 42, and is information related to the ink cartridge 4, and is correlated with that ink cartridge 4. As an example, information related to the ink cartridge 4 may be a cartridge ID, a cartridge type, remaining ink amount information, and the like, as shown in the drawing. In the embodiment, information related to the ink cartridge 4 also includes first status information and second status information representing the state of the ink cartridge 4. The data structure of the cartridge information 621 will be described in greater detail with reference to FIG. 4.

In the embodiment, the controller 61 references the cartridge information 621 read from the cartridge memory 42 in order to determine the state of the ink cartridge 4 accurately. By accurately grasping the state of the ink cartridge 4, the controller 61 can perform a suitable process for the ink cartridge 4 at the timing of a change in the contracted machine. The controller 61 may also reference the cartridge information 621 in the embodiment in order to determine propriety of switching to the subscription mode according to the mounted status of ink cartridges 4 in the image forming apparatus 1. The subscription mode is one of the operating modes of the image forming apparatus 1. In the subscription mode, the image forming apparatus 1 is recognized as the contracted machine in the image formation system 100 that is eligible to execute subscription printing in accordance with the agreement.

A device ID 622 is information for identifying the image forming apparatus 1. The device ID 622 is the serial number of the image forming apparatus, for example.

Mode information 623 is information indicating the operating mode of the image forming apparatus 1. For example, the two modes "subscription mode" and "non-subscription mode" are defined as the operating modes in the embodiment. The "subscription mode" denotes that the image forming apparatus 1 operates as a contracted machine for which the agreement is concluded. The non-subscription mode denotes that the image forming apparatus 1 is not the contracted machine but operates as a normal image forming apparatus for which no agreement is concluded.

When the image forming apparatus 1 is shipped, the main memory 62 stores, as default, mode information 623 indicating a value that corresponds to the non-subscription mode. The server 8 transmits a request to the image forming apparatus 1 of a user that concluded the agreement. The request includes a subscription transition instruction instructing the image forming apparatus 1 to transition to the subscription mode. In accordance with the request received from the server 8, the controller 61 changes the mode information 623 from the non-subscription mode to the subscription mode. The action of the controller 61 changing the value of the mode information 623 from the non-subscription mode to the subscription mode is called "transitioning to the subscription mode" in the example of the embodiment.

As another embodiment, the mode information 623 may indicate one of that the image forming apparatus 1 is in the subscription mode and that the image forming apparatus 1 is in the non-subscription mode. In a case where the image forming apparatus 1 is in the subscription mode, the mode information 623 may further indicate one of that the image forming apparatus 1 is in a non-charging state under the subscription mode and that the image forming apparatus 1 is in a charging state under the subscription mode. That is, the mode information 623 stored in the main memory 62 may be information indicating one of three states: (1) a non-subscription mode, (2) a non-charging state under the subscription mode, and (3) a charging state under the subscription mode.

The "non-charging state under the subscription mode" denotes a state in which the image forming apparatus 1 is in the subscription mode but use of the subscription service does not yet start. For example, this "non-charging state under the subscription mode" may occur when the timing at which the server 8 recognizes the image forming apparatus 1 as a contracted machine differs from the timing at which the server 8 considers that use of the subscription service starts in the image forming apparatus 1, as described above.

On the other hand, the "charging state under the subscription mode" indicates a state in which the image forming apparatus 1 is in the subscription mode and use of the subscription service started.

Status information 624 represents the status of the image forming apparatus 1. For example, the status information 624 in the embodiment may include an abnormality flag indicating one of that the image forming apparatus 1 is normal and that the image forming apparatus 1 is abnormal. In a case where the image forming apparatus 1 is abnormal, the status information may further include error information indicating details of the abnormality. By referencing the status information 624, the controller 61 can determine whether malfunction occurs in the image forming apparatus 1.

A first page counter 625 indicates the cumulative number of pages printed in the image forming apparatus 1. A second page counter 626 indicates the number of pages of printed matter that were printed in the image forming apparatus 1 using the subscription service. The count of the second page counter 626 may be reset to 0 each time the image forming apparatus 1 transitions from the subscription mode to the non-subscription mode or may be the cumulative value of pages of printed matter that were printed in the image forming apparatus 1 using the subscription service to the present time. Unless otherwise specified, the value of the second page counter 626 hereafter will be the cumulative number of pages printed in subscription printing to the present time.

A replacement number counter 627 indicates the number of times that subscription cartridges were replaced with new cartridges. The controller 61 increments the count of the replacement number counter 627 by 1 when a new ink cartridge 4 is mounted in the main casing of the image forming apparatus 1.

In addition to the information described above, the main memory 62 may have an area for storing the cumulative number of pages printed in the image forming apparatus 1, for example.

The communication interface 63 executes communication between the image forming apparatus 1 and the server 8 over a communication network such as the Internet, for example. The communication interface 63 outputs a request received from the server 8 to the controller 61. Here, a "request" indicates one of various requests, instructions, queries, and the like transmitted from the server 8 in subscription-related processes. The controller 61 performs calculations and outputs results in response to the above request, and the communication interface 63 returns the results to the server 8 as a "response." The action of the communication interface 63 returning the response may be omitted in the embodiment. For example, when the request is an instruction to modify various settings in the image forming apparatus 1, the controller 61 may modify the various settings in the image forming apparatus 1 in accordance with the instruction. However, the action of returning to the server 8 via the communication interface 63 a notification indicating that the settings were modified may be omitted.

Server 8

The server 8 is provided with a server communication interface 83, a server memory 82, and a server controller 81 (a controller). The server communication interface 83 is a communication interface that executes communication between the server 8 and the image forming apparatus 1. The server communication interface 83 transmits a request inputted from the server controller 81 to the image forming apparatus 1. The server communication interface 83 receives a response sent from the image forming apparatus 1 in response to the transmitted request, and outputs the response to the server controller 81.

The server communication interface 83 also communicates via a communication network with the user terminal 9 operated by the user of the image forming apparatus 1 and exchanges information with the user terminal 9. In the embodiment, the server communication interface 83 exchanges various information with the user terminal 9 needed for concluding the agreement. Specifically, the server communication interface 83 may receive from the user terminal 9 a subscription request message requesting to conclude the agreement. This subscription request message may include the device ID 622 identifying the image forming apparatus 1. After the server controller 81 executes subscription-related processes in response to this subscription request message, the server communication interface 83 may transmit to the user terminal 9 a notification indicating that the image forming apparatus 1 is recognized as the contracted machine.

The server memory 82 is a storage device that stores data required for operations on the server 8. The server memory 82 stores device information for each image forming apparatus 1 that enters a subscription service provided in the image formation system 100. The device information may include a device ID, a subscription flag, a subscription maximum page number, the model number of the image forming apparatus 1, and the date of manufacture, for example.

The device ID 622 is identification information with which the server 8 uniquely identifies the image forming apparatus 1. The subscription flag is information indicating one of that the image forming apparatus 1 transitioned to the subscription mode and that the image forming apparatus 1 does not transition to the subscription mode, i.e., information indicating one of that the image forming apparatus 1 is recognized as the contracted machine and that that the image forming apparatus 1 is not recognized as the contracted machine. The subscription maximum page number indicates the upper limit of pages that can be printed in subscription printing within the prescribed period stipulated under the agreement.

The server controller 81 is a CPU that performs overall control of the server 8. The server controller 81 creates a request for the image forming apparatus 1 at a prescribed timing and outputs the created request to the server communication interface 83. In the embodiment, the request includes the subscription transition instruction instructing the image forming apparatus 1 to transition to the subscription mode, for example. Triggered by the subscription request message transmitted from the user terminal 9, the server controller 81 controls the server communication interface 83 to transmit the subscription transition instruction described above to the user-desired image forming apparatus 1.

Based on responses received from the image forming apparatus 1 via the server communication interface 83, the server controller 81 also stores new device information in the server memory 82 and updates device information already stored therein. More specifically, when the server communication interface 83 receives from the user terminal 9 a subscription request message about an image forming apparatus 1 for which the user wishes to conclude an agreement, for example, the server controller 81 registers new device information of the image forming apparatus 1 in the server memory 82. At this time, the server controller 81 sets the initial value for the subscription flag to a value denoting "unconfirmed." The "unconfirmed" value for the subscription flag denotes a state in which the agreement was concluded between the user and the company but the server 8 itself does not yet confirm that the prospective image forming apparatus 1 for executing subscription printing transitioned to the subscription mode. In a case where the server controller 81 confirms through communication with the image forming apparatus 1 that the image forming apparatus 1 transitioned to the subscription mode, the server controller 81 updates the subscription flag for the image forming apparatus 1 to a value denoting "confirmed." Based on this process, the image forming apparatus 1 is confirmed as the contracted machine on the image forming system 100 that includes the server 8.

Data Structure

Figure 4:
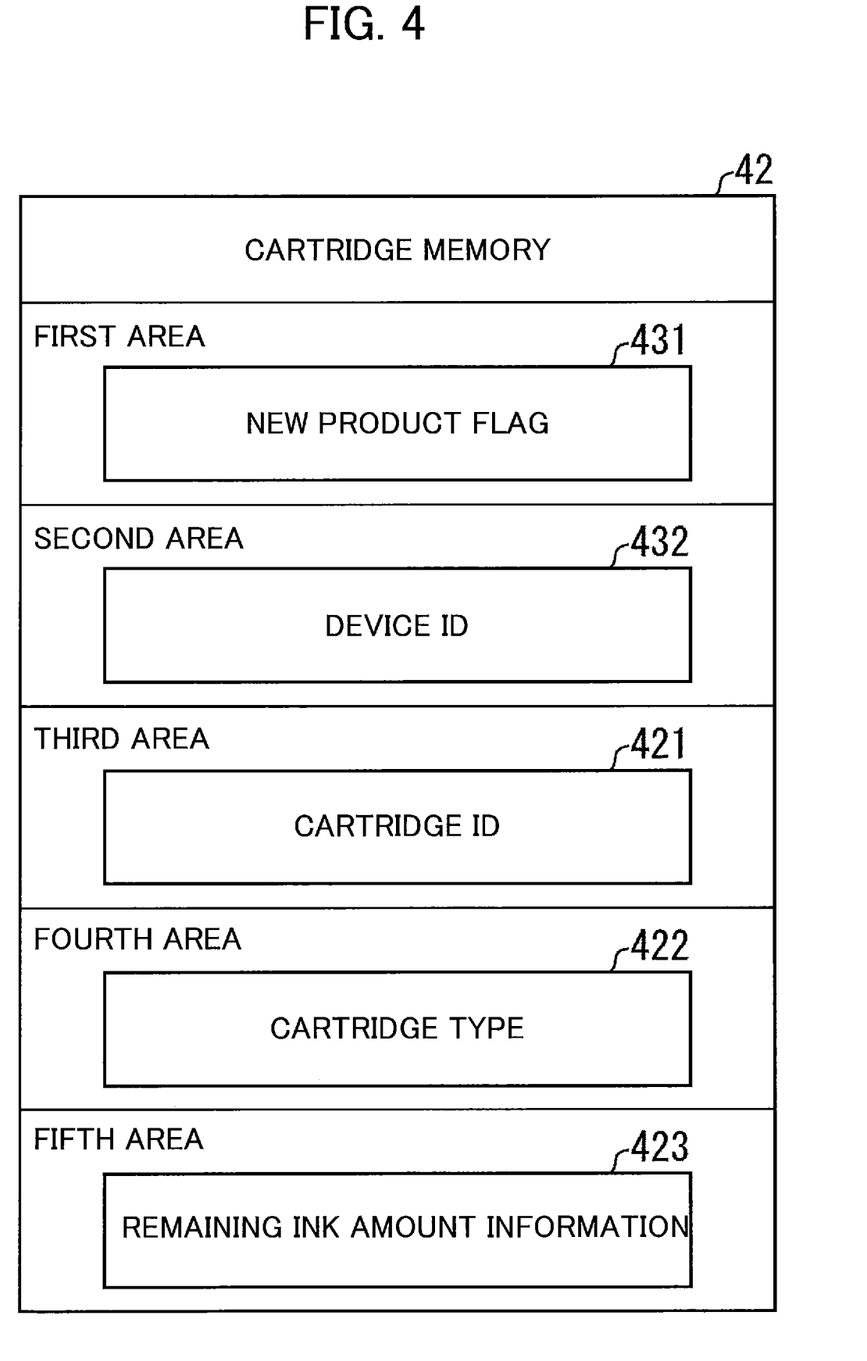
FIG. 4 is a block diagram illustrating a data structure of a cartridge memory.

FIG. 4 shows the data structure of the cartridge memory 42 in the ink cartridge 4. In one example, the cartridge memory 42 has at least five storage areas from a first area to a fifth area.

The first area is a storage area for storing first status information. The first status information indicates one of that the ink cartridge 4 is a new product and that the ink cartridge 4 is a used product. In this example, the first status information is a new product flag 431. The value "1" for the new product flag 431 may denote that the ink cartridge 4 is the new product, and the value "0" may denote that the ink cartridge 4 is the used product, for example.

The second area is a storage area for storing second status information. The second status information indicates one of that the ink cartridge 4 can be used temporarily in another image forming apparatus and that the ink cartridge 4 cannot be used temporarily in another image forming apparatus. In this example, the second status information is a device ID 432. For example, in a case where the second status information includes the device ID 432, the second status information denotes that temporary usage in another image forming apparatus is "not allowed." In a case where the second status information does not include the device ID 432, the second status information denotes that temporary usage in another image forming apparatus is "allowed." Hereinafter, the status of a subscription cartridge that is a used product but whose temporary usage is allowed in another image forming apparatus will be called "provisionally new."

As another example, the second status information is a provisionally new product flag. A value of "1" for the provisionally new product flag may denote that the ink cartridge 4 is in a provisionally new state allowing for temporary usage in another image forming apparatus, for example. A value of "0" for the provisionally new product flag may denote that usage of the ink cartridge 4 is prohibited in other image forming apparatuses.

The third area may store a cartridge ID 421. The cartridge ID 421 is a unique serial number for identifying an individual ink cartridge 4, for example. The cartridge ID 421 may include information indicating the color of ink in the ink cartridge 4, the model number of the ink cartridge 4, the manufacturer of the ink cartridge 4, the production lot of the ink cartridge 4, and the like.

The fourth area may store a cartridge type 422. The cartridge type 422 is information indicating the type of the ink cartridge 4. In the embodiment, the ink cartridge 4 may be set through at least one of two types: "subscription" and "commercial."

An ink cartridge 4 whose type is set to "subscription" in the fourth area is a special ink cartridge for the subscription service. Hereinafter, an ink cartridge of this type will be called a subscription cartridge. The image forming apparatus 1 can execute subscription printing while subscription cartridges are mounted therein. The company supplies subscription cartridges to users who concluded the agreement for image forming apparatuses 1.

An ink cartridge 4 whose type is set to "commercial" in the fourth area is a commercially available ink cartridge that can be purchased from electronics retail stores, online shopping websites, and the like. Hereinafter, an ink cartridge of this type will be called a commercial cartridge. Commercial cartridges may be genuine products manufactured by the manufacturer of the image forming apparatus 1, or third-party products manufactured by a different party from the manufacturer of the image forming apparatus 1.

The fifth area may store remaining ink amount information 423. The remaining ink amount information 423 indicates the remaining amount of ink in the ink cartridge 4. In this example, the remaining amount of ink is a value associated with one of a plurality of levels of remaining amounts from "full" to "empty." This value is stored in the fifth area. At each level of remaining ink amount, the user may be notified with a word, such as "Full," "Empty," and the like, based on the value described above; may be notified with a numerical value, such as "100%" through "0%"; or may be notified with a combination of these expressions.

Process Steps

Pre-Change Process

Figure 5:
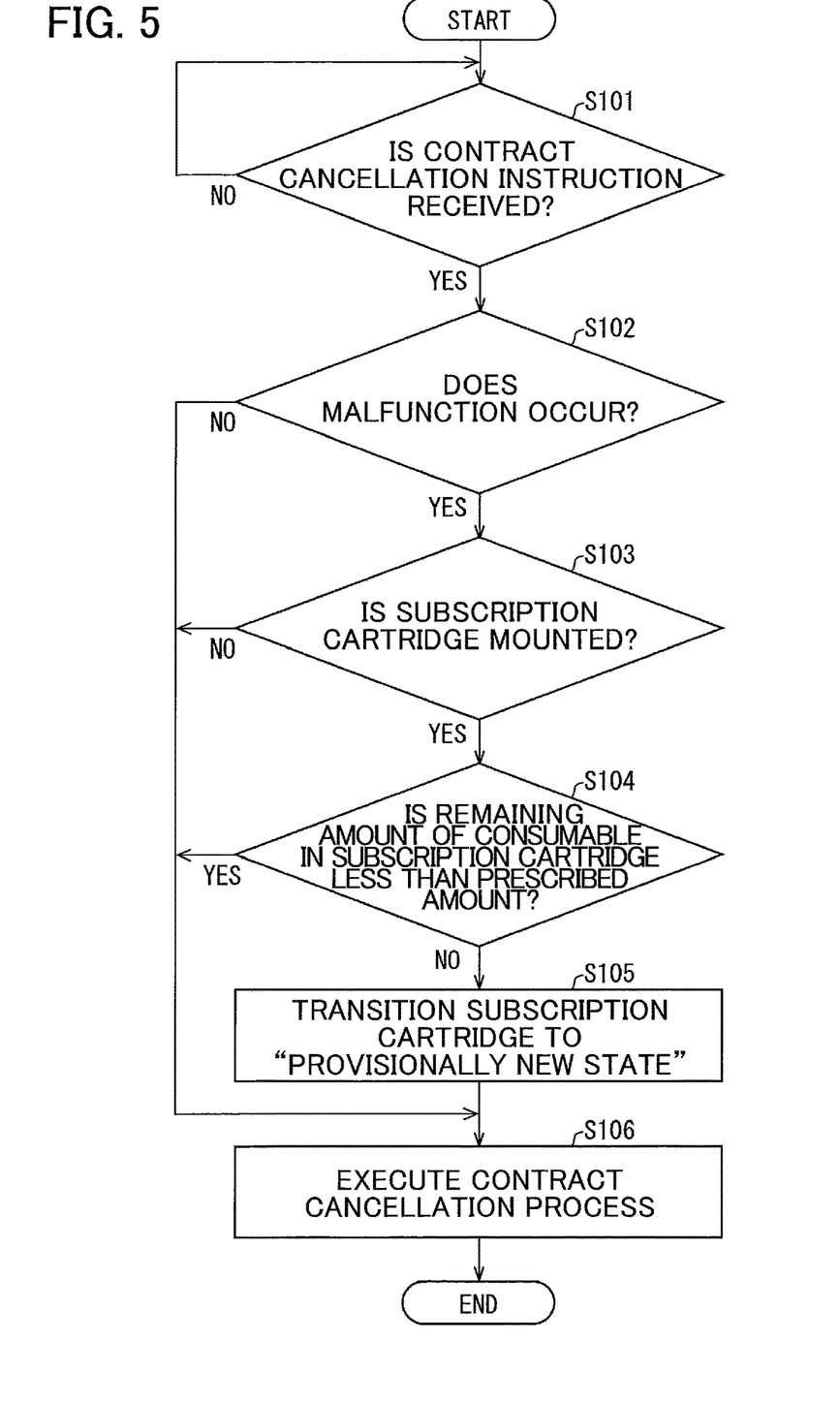
FIG. 5 is a flowchart showing steps in a pre-charge process executed by a pre-change image forming apparatus.

FIG. 5 is a flowchart showing steps in a process performed prior to changing contracted machines by the pre-change image forming apparatus 1. It is assumed that in a case where new subscription cartridges are mounted in an image forming apparatus 1 functioning as a contracted machine before the image forming apparatus 1 receives a contract cancellation instruction, the image forming apparatus 1 will execute a restriction process (restriction step) for restricting use of these subscription cartridges in other image forming apparatuses 1. For example, in the restriction process the controller 61 updates the new product flag 431 stored in the first area of the cartridge memory 42 of the mounted subscription cartridge to indicate a used product by modifying the new product flag 431 from "1" to "0". Next, the controller 61 writes the device ID 432 of the image forming apparatus 1 to the second area in the cartridge memory 42.

The controller 61 subsequently starts the series of processes shown in FIG. 5 when receiving a contract cancellation instruction from the server 8, for example. The contract cancellation instruction is an instruction to cancel the agreement that was concluded for the image forming apparatus 1.

In S101, the controller 61 determines whether the contract cancellation instruction is received from the server 8. In a case where the controller 61 determines that the contract cancellation instruction is received (S101: YES), the controller 61 advances to the process of S102.

In S102, the controller 61 executes a first determination process to determine whether the image forming apparatus 1 has a malfunction. For example, when the status information 624 stored in the main memory 62 indicates that the malfunction occurs in the image forming apparatus 1, the controller 61 determines in the first determination process that the image forming apparatus 1 has the malfunction. Possible malfunctions that may be determined includes a malfunction requiring that the image forming apparatus 1 be replaced, such as a malfunction in the printing function that cannot be restored. As another example, in a case where the status information of the image forming apparatus 1 indicating the malfunction is transmitted from the server 8 together with the contract cancellation instruction, the controller 61 may determine that the image forming apparatus 1 has the malfunction. In a case where the controller 61 determines that the image forming apparatus 1 has the malfunction (S102: YES), the controller 61 advances to the process of S103. However, in a case where the controller 61 determines that the image forming apparatus 1 does not have the malfunction (S102: NO), the controller 61 advances to the process of S106.

As another example, the controller 61 may execute a fourth determination process of S102 in addition to or in place of the first determination process. In the fourth determination process, the controller 61 determines whether the reason for cancelling the agreement is to change contracted machines. For example, in the fourth determination process the controller 61 references objective information indicating the objective for cancelling the agreement that was transmitted from the server 8 together with the contract cancellation instruction. In a case where the controller 61 determines based on the objective information that the objective for cancelling the subscription is to change the image forming apparatus for which the agreement is concluded to another image forming apparatus (S102: YES), the controller 61 advances to the process of S103. On the other hand, in a case where the controller 61 determines that the objective for cancelling the subscription is not to change contracted machines (S102: NO), the controller 61 advances to the process of S106.

In S103, the controller 61 determines the type of the mounted ink cartridge 4. Specifically, the controller 61 reads the cartridge type 422 from the fourth area of the cartridge memory 42 for each mounted ink cartridge 4. Next, the controller 61 determines the type of the ink cartridge 4 based on the corresponding cartridge type 422 which indicates "subscription" or "commercial." In a case where the controller 61 determines that the mounted ink cartridge 4 is the subscription cartridge (S103: YES), the controller 61 advances to the process of S104. On the other hand, in a case where the controller 61 determines that the ink cartridge 4 is the commercial cartridge (S103: NO), the controller 61 advances to the process of S106.

In S104, the controller 61 executes a second determination process to determine whether the remaining amount of ink in the subscription cartridge is less than a prescribed amount, or is greater than or equal to the prescribed amount. Specifically, the controller 61 reads the remaining ink amount information 423 stored in the fifth area of the cartridge memory 42 and compares the remaining ink amount indicated by the remaining ink amount information 423 with a threshold value indicating the prescribed amount. In a case where the controller 61 determines that the remaining ink amount of the subscription cartridge is less than the prescribed amount (S104: YES), the controller 61 advances to the process of S106. Hence, the controller 61 does not execute the updating process of S105 described later. On the other hand, in a case where the controller 61 determines that the remaining ink amount in the subscription cartridge is greater than or equal to the prescribed amount (S104: NO), the controller 61 advances to the process of S105. In other words, the controller 61 executes an updating process of S105 described later.

Alternatively, the controller 61 may determine in S104 whether the remaining amount of ink in the subscription cartridge is more than the prescribed amount, or is less than or equal to the prescribed amount. In a case where the controller 61 determines that the remaining amount of ink in the subscription cartridge is less than or equal to the prescribed amount (S104: YES), the controller 61 advances to the process of S106. Hence, the controller 61 does not execute the updating process of S105 described later. On the other hand, in a case where the controller 61 does not determine that the remaining amount of ink in the subscription cartridge is less than or equal to the prescribed amount, i.e., determines that the remaining ink amount is greater than the prescribed amount (S104: NO), the controller 61 advances to the process of S105.

In S105, the controller 61 executes an updating process (the updating step) to transition the mounted subscription cartridge to a provisionally new state. Specifically, the controller 61 updates the second status information stored in the second area of the cartridge memory 42, which indicates one of that the cartridge can be temporarily used in another image forming apparatus and that the cartridge cannot be temporarily used in another image forming apparatus, to "allowed". More specifically, the controller 61 may update the second status information to "allowed" in the updating process by deleting the device ID 432 from the second area of the cartridge memory 42. As another example, the controller 61 may update the second status information to "allowed" by setting the provisionally new flag on, that is, by updating the provisionally new flag from "0" to "1", for example.

In a case where a plurality of ink cartridges 4 is mounted in the image forming apparatus 1, the controller 61 repeats the processes in S103-S105 for each ink cartridge 4.

In S106, the controller 61 executes a contract cancellation process for the image forming apparatus 1 in accordance with the contract cancellation instruction received in S101. As an example, the controller 61 may return the image forming apparatus 1 from the subscription mode to the non-subscription mode in the contract cancellation process.

Specifically, the controller 61 may update the mode information 623 stored in the main memory 62 from a value corresponding to the subscription mode to a value corresponding to the non-subscription mode. Next, the controller 61 may return to the server 8 a message acknowledging the contract cancellation and notifying the server 8 that the transition to the non-subscription mode is complete.

Post-Change Process

Figure 6:
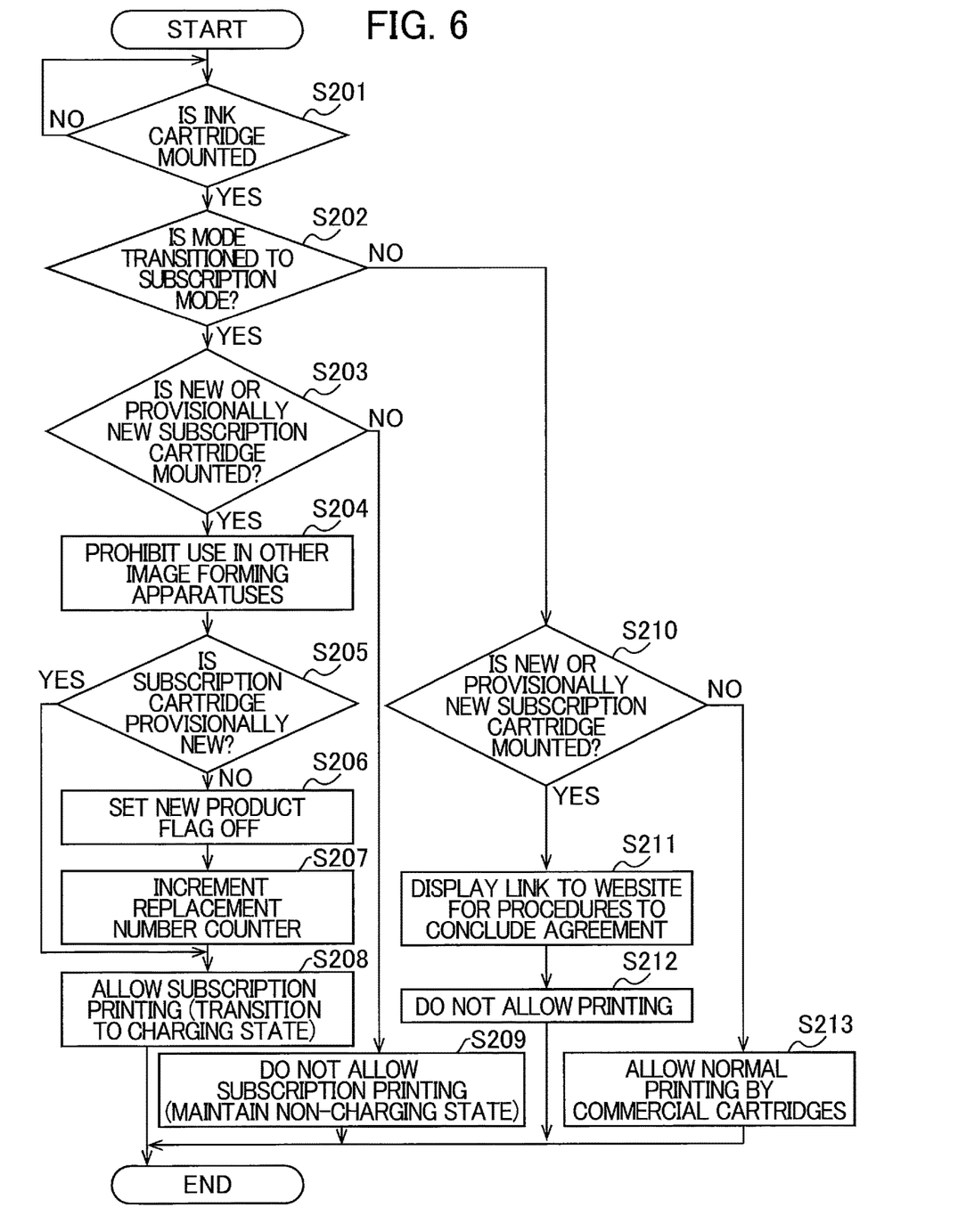
FIG. 6 is a flowchart illustrating steps in a post-charge process executed by a post-charge image forming apparatus.

FIG. 6 is a flowchart showing steps in a process which is performed after changing contracted machines by the post-change image forming apparatus 1. The post-change image forming apparatus 1 is another image forming apparatus having a different device ID from the pre-change image forming apparatus 1 described above. However, as with the pre-change image forming apparatus 1, the controller 61 in the post-change image forming apparatus 1 may be provided with a function for executing the pre-change process described based on FIG. 5.

The controller 61 begins the series of steps shown in FIG. 6 when the controller 61 detects that a cartridge is mounted in the image forming apparatus 1, for example.

In S201, the controller 61 determines whether the ink cartridge 4 is mounted in the main casing. In a case where the controller 61 determines that the ink cartridge 4 is mounted (S201: YES), the controller 61 advances to the process of S202.

In S202, the controller 61 executes a third determination process for determining whether the image forming apparatus 1 transitioned to the subscription mode.

The controller 61 executes the process to transition to the subscription mode in response to a subscription transition instruction transmitted from the server 8, for example. Specifically, when the subscription transition instruction is received from the server 8, the controller 61 updates the mode information 623 stored in the main memory 62 from a value corresponding to the non-subscription mode to a value corresponding to the subscription mode. By updating the mode information 623 to indicate the subscription mode, the image forming apparatus 1 completes the transition to the subscription mode. The controller 61 may notify the server 8 that the transition to the subscription mode was carried out in accordance with the subscription transition instruction.

With the configuration described above, the controller 61 determines in the third determination process whether the image forming apparatus 1 transitioned to the subscription mode based on the mode information 623 stored in the main memory 62. In a case where the controller 61 determines that the mode information 623 indicates the subscription mode and, based on this determination, determines that the image forming apparatus 1 already transitioned to the subscription mode (S202: YES), the controller 61 advances to the process of S203. However, in a case where the controller 61 determines that the mode information 623 indicates the non-subscription mode and, based on this determination, determines that the image forming apparatus 1 did not transition to the subscription mode (S202: NO), the controller 61 advances to the process of S210.

In S203, the controller 61 determines whether the mounted ink cartridge 4 is a subscription cartridge which is in one of the new or provisionally new state, or some other cartridges. For example, the controller 61 determines whether the ink cartridge 4 is the subscription cartridge or the commercial cartridge based on the cartridge type 422 stored in the fourth area of the cartridge memory 42. Next, the controller 61 references the new product flag 431 stored in the first area of the cartridge memory 42. The controller 61 determines that the ink cartridge 4 is the new product in a case where the new product flag 431 indicates a new product. Further, in a case where the new product flag 431 indicates the used product and a device ID 432 is not stored in the second area of the cartridge memory 42, the controller 61 determines that the ink cartridge 4 is provisionally new. Alternatively, the controller 61 may determine that the ink cartridge 4 is provisionally new when the provisionally new flag is stored in the second area and indicates the provisionally new product. In a case where the controller 61 determines that the mounted ink cartridge 4 is in the new or provisionally new state (S203: YES), the controller 61 advances to the process of S204. However, in a case where the controller 61 determines that the mounted ink cartridge 4 is neither the new nor provisionally new subscription cartridge, i.e., that the ink cartridge 4 is the commercial cartridge or the used subscription cartridge which can be used for printing only in another image forming apparatus (S203: NO), the controller 61 advances to the process of S209.

In S204, the controller 61 executes a rewrite process for disabling use of the mounted ink cartridge 4 in other image forming apparatuses. As one example of the rewrite process, the controller 61 stores the device ID 432 of the image forming apparatus 1 in the second area of the cartridge memory 42. Through this process, the ink cartridge 4 is restricted from being used on image forming apparatuses other than the image forming apparatus 1 identified by the device ID 432. Alternatively, the controller 61 may set the provisionally new flag to off in the second area to re-restrict usage of the ink cartridge 4 in other image forming apparatuses for which use was temporarily allowed.

In S205, the controller 61 determines whether the mounted subscription cartridge is new or provisionally new. For example, the controller 61 determines that the subscription cartridge is new in a case where the new product flag 431 stored in the first area of the cartridge memory 42 indicates a new product. On the other hand, the controller 61 determines that the mounted subscription cartridge is provisionally new in a case where the new product flag 431 stored in the first area indicates the used product and the device ID 432 for an image forming apparatus other than the image forming apparatus 1 is stored in the second area. However, the controller 61 may determine that the mounted subscription cartridge is provisionally new in a case where the new product flag 431 stored in the first area indicates the used product and the device ID 432 for the image forming apparatus 1 is stored in the second area. As another example, the controller 61 may determine that the subscription cartridge is new in a case where the new product flag 431 is the value "1", and determine that the subscription cartridge is provisionally new in a case where the new product flag 431 is the value "0" and the provisionally new flag is the value "1". In a case where the controller 61 determines that the mounted subscription cartridge is new (S205: NO), the controller 61 advances to the process of S206. However, in a case where the controller 61 determines that the subscription cartridge is provisionally new (S205: YES), the controller 61 advances to the process of S208. Hence, in a case where the mounted subscription cartridge is a new product, the controller 61 executes a new product management process shown in S206 and S207 described later as a process peculiar to times when the new product is mounted. On the other hand, the controller 61 does not execute the new product management process in a case where the mounted subscription cartridge is used and/or provisionally new.

In S206, the controller 61 sets the new product flag for the mounted subscription cartridge to off as the new product management process. Specifically, the controller 61 updates the value of the new product flag 431 stored in the first area of the cartridge memory 42 from "1" to "0".

In S207, the controller 61 increases the count representing the number of times subscription cartridges were replaced with new products as the new product management process. For example, the replacement number counter 627 is stored in the main memory 62 for managing the number of times that subscription cartridges were replaced. In S207, the controller 61 increments the replacement count in the replacement number counter 627 by 1, for example.

In S208, the controller 61 executes a permission process to allow subscription printing in the image forming apparatus 1. In the permission process, the controller 61 may notify the server 8 that subscription printing is allowed. The server 8 can consider this notification as the start of usage of the subscription service in the image forming apparatus 1 that allows the start of charging.

Note that the rewrite process of S204 may be executed at any timing after the YES determination in S203. For example, the rewrite process of S204 may be executed after the permission process of S208.

In S209, the controller 61 does not allow execution of subscription printing in the image forming apparatus 1. Hence, the controller 61 can restrict a used subscription cartridge, which can be used only in another image forming apparatus, from being used for subscription printing in the image forming apparatus 1. In S209 the server 8 continues recognizing that the image forming apparatus 1 "is a contracted machine but does not yet start using the subscription service" and does not start charging. Note that in a case where commercial cartridges rather than the used subscription cartridges are mounted in the image forming apparatus 1, though the controller 61 does not allow subscription printing, the controller 61 may allow normal printing.

In S210, the image forming apparatus 1 is in the non-subscription mode. As in S203, in S210 the controller 61 determines whether the mounted ink cartridge 4 is the subscription cartridge which is in one of the new and provisionally new states, or some other cartridges. In a case where the controller 61 determines that the mounted ink cartridge 4 is a new or provisionally new subscription cartridge (S210: YES), the controller 61 advances to the process of S211. On the other hand, in a case where the controller 61 determines that the ink cartridge 4 is the used subscription cartridge that cannot be used in the image forming apparatus 1 or the commercial cartridge (S210: NO), the controller 61 advances to the process of S213.

In S211, the controller 61 executes a transition support process prompting the user to perform operations for transitioning the image forming apparatus 1 to the subscription mode. For example, the controller 61 may display, on the display of the image forming apparatus 1 or the display of the user terminal 9, a message prompting the user to perform each procedure to conclude the agreement. The controller 61 may also perform input support to assist the user in transitioning the image forming apparatus 1 into the subscription mode. For example, the controller 61 may display information on each display portions described above linking to a website to execute each procedure needed to conclude the agreement.

In S212, the controller 61 restricts printing. In other words, the controller 61 restricts subscription printing in a state where the image forming apparatus 1 did not transition to the subscription mode and, hence, is not recognized by the server 8 as a contracted machine. Additionally, the controller 61 restricts normal printing in a state where subscription cartridges are mounted in the image forming apparatus 1.

In S213, the controller 61 allows normal printing in a state where only commercial cartridges are mounted in the image forming apparatus and no subscription cartridge is mounted in the image forming apparatus 1. Note that the controller 61 may restrict both normal printing and subscription printing in a case where even one used subscription cartridge that can only be used in another image forming apparatus is mounted in the image forming apparatus 1.

Variations

The image forming apparatus 1 may be any device that is provided with a communication function, and a function for printing using consumables, such as ink cartridges or toner cartridges. For example, the image forming apparatus 1 may be an inkjet printer or a laser printer. Alternatively, the image forming apparatus 1 may be a multifunction peripheral (MFP) provided with a combination of other functions, such as a scanner or a facsimile function.

In a case where the image forming apparatus 1 is a laser printer, a drum cartridge and a toner cartridge are mounted in the image forming apparatus 1 instead of the ink cartridge 4. Note that there is no particular restriction on the numbers of drum cartridges and toner cartridges mounted in the image forming apparatus 1 and no particular restriction on the structures of the drum cartridges and toner cartridges.

For example, the drum cartridge and the toner cartridge may be provided as independent cartridges. The drum cartridge and the toner cartridge may be integrally configured by mounting the toner cartridge in the drum cartridge. In a state where the toner cartridge is mounted in the drum cartridge, the toner cartridge is mounted together with the drum cartridge into the main casing of the image forming apparatus 1.

In a case where the drum cartridge and the toner cartridge are independent cartridges, the structures of the drum cartridge and toner cartridge may be one of the following three types.

As an example of the first structure, the drum cartridge is provided with a cartridge casing. A photosensitive drum, a drum memory, and a developing roller may be provided in the cartridge casing. The toner cartridge may be provided with a cartridge casing, and a toner memory may be provided in the cartridge casing. The cartridge casing of the toner cartridge accommodates toner. The outer peripheral surface of the developing roller contacts the outer peripheral surface of the photosensitive drum inside the drum cartridge, whereby developer (i.e., toner) is applied to the surface of the photosensitive drum. Data indicated in a print job is printed on paper by transferring the toner applied to the photosensitive drum to the paper with a transfer belt.

As an example of the second structure, the cartridge casing of the drum cartridge may be provided with the photosensitive drum and the drum memory. The developing roller may be provided in the cartridge casing of the toner cartridge. The outer peripheral surface of the developing roller contacts the outer peripheral surface of the photosensitive drum inside the drum cartridge.

As an example of the third structure, the developing cartridge including the developing roller may be mounted in the image forming apparatus 1 separate from the drum cartridge and a toner cartridge. In this case, the drum cartridge has the cartridge casing, the photosensitive drum, and the drum memory. The toner cartridge has a cartridge casing and a toner memory. The cartridge casing of the toner cartridge accommodates toner. In the example of the third structure, the three parts including the drum cartridge, the toner cartridge, and the developing cartridge are mounted in the main casing.

The drum memory stores a drum ID, drum type information, and drum life information, for example. Note that the drum ID and the drum life information are not required information in the present disclosure. The drum type information indicates one of that the drum cartridge is a special drum cartridge for the subscription and that the drum cartridge is a normal drum cartridge.

The toner memory stores a toner ID, toner type information, and toner life information, for example. Note that the toner ID and the toner life information are not required information in the present disclosure. The toner type information indicates one of that the toner cartridge is a special toner cartridge for the subscription and the toner cartridge is a normal toner cartridge.

In a case where the image forming apparatus 1 is the laser printer, the main memory 62 stores drum information and toner information rather than ink information. The drum information is information in which for each drum cartridge, a drum ID, drum type information, and drum life information read from the drum memory of the drum cartridge are correlated with each other. The toner information is information in which for each toner cartridge, a toner ID, toner type information, and toner life information read from the toner memory of the toner cartridge are correlated with each other.

Hence, the drum cartridge and the toner cartridge may be integrally configured as an integrated cartridge. The integrated cartridge has a cartridge casing, a photosensitive drum, a memory, and a developing roller. The outer peripheral surface of the developing roller contacts the outer peripheral surface of the photosensitive drum inside the integrated cartridge. The cartridge casing of the integrated cartridge accommodates toner. The memory in the integrated cartridge stores the various information stored in the drum memory and the toner memory described above.

The processes illustrated in the flowcharts referenced in the embodiment described above are still applicable to the image forming apparatus 1 in a case where the image forming apparatus 1 is the laser printer. Specifically, the subscription cartridges described in the embodiment may be modified from the ink cartridges 4 to the drum cartridges and the toner cartridges (or the integrated cartridges) in a case where the image forming apparatus 1 is the laser printer.

Note that the drum life information and the toner life information are stored in the fifth area of the cartridge memory 42 in the integrated cartridge in place of the remaining ink amount information 423 in a case where the image forming apparatus 1 is the laser printer. In a case where the drum cartridge and the toner cartridge are not integrated, the drum life information is stored in the fifth area of the cartridge memory 42 in the drum cartridge and the toner life information is stored in the fifth area of the cartridge memory 42 in the toner cartridge.

The image forming apparatus 1 according to the variations has the same effects as the embodiment described above.

Implementation Through Software

The control block for the image forming apparatus 1 and the server 8 may be implemented by logic circuits (hardware) formed on an integrated circuit (a chip) or the like or may be implemented through software.

In the latter case, each of the image forming apparatus 1 and the server 8 are provided with a computer to execute instructions in a program, which is software for implementing each function. This computer is provided with one or more processors, and a computer-readable storage medium for storing the program described above, for example. In this computer, the processor reads the program from the storage medium and executes the program to attain the objects of the present disclosure. A central processing unit (CPU) may be used as the processor, for example. The storage medium may be a "non-transitory, tangible medium," such as ROM, a tape, a disc, a card, semiconductor memory, or a programmable logic circuit. Random-access memory (RAM) may also be provided for developing the program. The program may also be supplied to the computer described above via any transmission medium (a communication network, broadcast waves, etc.) capable of transmitting the program. Note that one aspect of this specification is that the program can be implemented in the form of data signals embedded in a carrier wave, as embodied in electronic transmission.

While the disclosure has been described in detail with reference to the specific embodiment thereof, it would be apparent to those skilled in the art that various changes and modifications may be made therein without departing from the scope of the invention.

What is claimed is:

1. An image forming apparatus comprising:
   a main casing;
   a main memory;
   a consumable configured to accommodate printing material and to be mounted in the main casing, the consumable including a consumable memory; and
   a controller,
   wherein at least one of the main memory and the consumable memory stores first status information indicating one of that the consumable is a new product and that the consumable is a used product that can be used only in the image forming apparatus,
   wherein the consumable memory stores second status information indicating one of that the consumable can be temporarily used in another image forming apparatus and that the consumable cannot be temporarily used in the another image forming apparatus,
   wherein the controller is configured to perform:
      a restriction process to rewrite the first status information to indicate the used product to prohibit the consumable from being used in other image forming apparatuses in a case where the first status information stored in the one of the consumable memory and the main memory indicates the new product; and
      an updating process to update the second status information so that the second status information indicates that the consumable can be temporarily used in the another image forming apparatus in a case where the controller receives a contract cancellation instruction, the contract cancellation instruction instructing to cancel an agreement concluded for the image forming apparatus.

2. The image forming apparatus according to claim 1, wherein the controller is further configured to further perform:
   a first determination process in a case where the contract cancellation instruction is received, the first determination process including one of:
      determining whether status information of the image forming apparatus stored in the main memory indicates that malfunction occurs in the image forming apparatus; and determining whether the status information received together with the contract cancellation instruction indicates that the malfunction occurs in the image forming apparatus,
wherein the controller is configured to further perform:
updating the first status information to the second status information in a case where the first determination process determines that the malfunction occurs in the image forming apparatus.

3. The image forming apparatus according to claim 1, wherein the controller is configured to further perform:
a second determination process to determine whether a remaining amount of the consumable is smaller than or equal to a prescribed amount,
wherein the controller does not perform the updating process in a case where the remaining amount of the consumable is smaller than or equal to the prescribed amount.

4. The image forming apparatus according to claim 1, wherein the controller is configured to further perform:
a second determination process to determine whether a remaining amount of the consumable is smaller than or equal to a prescribed amount,
wherein the controller performs the updating process in a case where the second determination process determines that the remaining amount of the consumable is greater than the prescribed amount.

5. The image forming apparatus according to claim 1, wherein the second status information includes identification information of the image forming apparatus,
wherein in the updating process the controller updates the second status information so that the second status information indicates that that the consumable can be temporarily used in the another image forming apparatus by deleting the identification information from the consumable memory.

6. The image forming apparatus according to claim 1, wherein in the updating process the controller updates the second status information so that the second status information indicates that that the consumable can be temporarily used in the another image forming apparatus by storing in the consumable memory information indicating that temporary usage of the consumable in the another image forming apparatus can be allowed.

7. The image forming apparatus according to claim 1, the controller is configured to perform:
a permission process to allow execution of printing in a case where the consumable memory stores one of the first status information indicating the new product and the second status information indicating that the consumable can be temporarily used in the another image forming apparatus; and
a rewriting process in a case where the consumable memory stores one of the first status information indicating the new product and the second status information indicating that the consumable can be temporarily used in the another image forming apparatus, the rewriting process being to rewrite the second status information to indicate that the consumable cannot be temporarily used in the another image forming apparatus.

8. The image forming apparatus according to claim 7, wherein the consumable memory includes:
a first area configured to store the first status information; and
a second status area configured to store the second status information,
wherein the controller is configured to perform:
a new product management process in a case where the first area stores the first status information indicating the new product, the new product management process being peculiar process when the new product is mounted in the main casing,
wherein the controller does not perform the new product management process in a case where the first area does not store the first status information indicating the used product.

9. The image forming apparatus according to claim 7, wherein the controller is configured to further perform:
a third determination process in a case where the consumable is mounted in the main casing, the third determination process being to determine whether the image forming apparatus is in a subscription mode, the subscription mode being executed in the image forming apparatus for which the agreement is concluded,
wherein the controller is configured to further perform:
a transition support process to prompt an operation to transition the image forming apparatus to the subscription mode in a case where the third determination process determines that the image forming apparatus is not in the subscription mode,
wherein the controller performs the permission process after the image forming apparatus transitions to the subscription mode.

10. The image forming apparatus according to claim 9, wherein the main memory stores mode information indicating one of that the image forming apparatus is in the subscription mode and that the image forming apparatus is not in the subscription mode,
wherein in the third determination process, the controller performs:
determining that the image forming apparatus is in the subscription mode in a case where the mode information indicates that the image forming apparatus is in the subscription mode; and
determining that the image forming apparatus is not in the subscription mode in a case where the mode information indicates that the image forming apparatus is not in the subscription mode.

11. The image forming apparatus according to claim 1, wherein the controller is configured to further perform:
a fourth determination process in a case where the contract cancellation instruction is received, the fourth determination process being to determine whether objective information indicating an objective for cancelling the subscription, which is received together with the contract cancellation instruction, indicates that the objective is that an image forming apparatus for which the agreement is concluded is changed to another image forming apparatus,
wherein in the updating process the controller updates the first status information to the second status information in a case where the fourth determination process determines that the objective for cancelling the subscription is changing the image forming apparatus.

12. A method for controlling an image forming apparatus, wherein the image forming apparatus includes: a main casing; a main memory; a consumable configured to accommodate printing material and to be mounted in the main casing, the consumable including a consumable memory; and a controller,
wherein at least one of the main memory and the consumable memory stores first status information indicating one of that the consumable is a new product and that the consumable is a used product that can be used only in the image forming apparatus, wherein the consumable memory stores second status information indicating one of that the consumable can be temporarily used in another image forming apparatus and that the consumable cannot be temporarily used in the another image forming apparatus, the method comprising:

a restriction step to rewrite the first status information to indicate the used product to prohibit the consumable from being used in other image forming apparatuses in a case where the first status information stored in the one of the consumable memory and the main memory indicates the new product; and an updating step to update the second status information so that the second status information indicates that the consumable can be temporarily used in the another image forming apparatus in a case where a contract cancellation instruction is received, the subscription cancellation instruction instructing to cancel an agreement concluded for the image forming apparatus.

* * * * *